United States Patent [19]

Nuss

[11] Patent Number: 4,646,957
[45] Date of Patent: Mar. 3, 1987

[54] DEVICE FOR CONNECTING ELECTRIC CONDUCTORS

[75] Inventor: Lothar Nuss, Offenbach, Fed. Rep. of Germany

[73] Assignee: Stapla Ultraschall-Technik GmbH, Fed. Rep. of Germany

[21] Appl. No.: 632,447

[22] Filed: Feb. 24, 1986

[30] Foreign Application Priority Data

Mar. 7, 1985 [DE] Fed. Rep. of Germany ....... 3508122

[51] Int. Cl.⁴ .............................................. B23K 20/10
[52] U.S. Cl. ........................................ 228/1.1; 29/873
[58] Field of Search .......................... 228/1.1, 110, 111; 29/873, 882

[56] References Cited

U.S. PATENT DOCUMENTS

| | | | |
|---|---|---|---|
| 3,700,532 | 10/1972 | Pierson | 228/1.1 X |
| 4,032,382 | 6/1977 | Obeda | 228/110 X |
| 4,596,352 | 6/1986 | Knapp | 228/1.1 |

FOREIGN PATENT DOCUMENTS

| | | | |
|---|---|---|---|
| 3151151 | 6/1983 | Fed. Rep. of Germany | 228/1.1 |
| 3407462 | 9/1985 | Fed. Rep. of Germany | 228/1.1 |

Primary Examiner—Kenneth J. Ramsey
Attorney, Agent, or Firm—Allegretti, Newitt, Witcoff & McAndrews, Ltd.

[57] ABSTRACT

An ultrasonic welding apparatus for electrical conductors comprising strands of wire comprising a sonotrode for generating ultrasonic vibrations and a cooperating anvil having movable side walls to compress the wire strands against the head of the sonotrode. The anvil has two moving parts, one moving back and forth parallel to the fixed sonotrode face, and the other moving up and down normal to the fixed face. The moving parts carry the side walls of the anvil and with the fixed face provide an adjustable space for wires of various sizes, the space having a rectangular cross section. The gap between the moving anvil parts and the adjacent fixed face of the sonotrode are accurately controlled.

7 Claims, 6 Drawing Figures

DEVICE FOR CONNECTING ELECTRIC CONDUCTORS

This invention concerns a device for ultrasonically welding electric conductors, preferably in stranded form, comprising a sonotrode which produces ultrasonic vibration and an anvil as a mating tool. The anvil is a vice-like device having three movable faces which are very close to one another and which, together with the face of the sonotrode, serve to define a space in which the conductors can be compressed to varying dimensions while ultrasonic vibration is being applied to them. When the anvil is in closed position and the conductors are being compressed to one another, the anvil faces lie roughly parallel to the axis of sonotrode vibration. When the anvil is in open position, the end faces are left open for the conductors to pass through it.

A device of this type is known (DE-PS No. 31 51 151) where provision is made for conductors of various thicknesses by providing several recesses of different sizes along the edge faces of the sonotrode which match corresponding projections on the anvil. Recesses in the sonotrode and projections on the anvil constitute pairs of compression spaces of different dimensions which are defined by a pair of sonotrode surfaces and a pair of anvil faces in each instance. For this reason, it is not sufficient for the sonotrode and the anvil to be arranged so as to slide towards one another in order to allow the insertion of the conductors which are to be connected; both of these two components also have to revolve about their respective axes for the corresponding recesses and projections to be aligned with one another, in order to achieve compression spaces of varying dimensions.

The construction of this known device is costly because of the need to be able to rotate and adjust both the anvil and the sonotrode, particularly since narrow gaps, measuring a few hundredths of a millimeter, have to be accurately maintained between the neighboring parallel faces of the anvil and the sonotrode. For this reason, precise fine adjustment of the dimensions of the gap between the anvil and the sonotrode has to be provided for every possible relative position between these two components. In addition, in this known device, even when the anvil is in the raised position, only the end faces of the compression space are open for insertion of the conductors to be connected because the parallel faces in the immediate proximity, that is to say the edges of the sonotrode and the corresponding faces of the anvil cannot be separated from one another.

The purpose of this invention is to provide a device of the type referred to above, which is of simple design and which, while it manages to circumvent the disadvantages of the known device, provides compression spaces of varying dimensions without requiring complicated adjustments of the anvil and sonotrode. This design also permits simplified insertion into the compression space of the conductors to be connected.

This requirement is met in this invention by the provision of two separate anvil parts, one of which is provided with a first anvil face whereas the other anvil part is provided with a third anvil face opposed and parallel to said first anvil face and a second anvil face at right angles to said third face. A compression space of rectangular cross section is defined by the first, second and third anvil faces together with one face of the sonotrode. The first anvil part can be moved horizontally toward and away from the second anvil part. The second anvil part can be moved vertically toward and away from the sonotrode face, which is fixed. Thus, the distance between the first anvil face and the third anvil face opposite to it and the distance between the second anvil face and the sonotrode face opposite to it, can be enlarged or contracted steplessly, i.e. infinitely variable.

A fundamental feature of this invention is the fact that the compression space is defined by three mobile faces and by one fixed sonotrode face. The sonotrode therefore does not require any additional adjusting for compressing spaces of different sizes. The two anvil parts with the three anvil faces are provided with a mobile mounting so that the narrow gaps set between neighboring parallel faces of the anvil and sonotrode can be maintained while the two anvil parts are adjusted. For this reason, there is no need for any additional fine adjustment to maintain the narrow gaps when the compression space is adjusted to different sizes. The size of the compression space is determined as a function of the sum of the cross sections of the conductors which are to be connected and of the required degree of compression. In addition, the division of the effective anvil faces into two parts which can be moved in different directions allows for a gap between the two parts of the anvil, so that the conductors which are to be connected can be conveniently inserted between the two anvil parts into the compression space and extracted again after the ultrasonic treatment.

An advantageous feature of this invention is that the sonotrode is supported at fixed points in the final sound node just short of the working head of the sonotrode. This results in only very low leverage between the fixed points, at which vibration amplitudes undergo their last zero pass, and the sonotrode working head. This low leverage means that the free end of the sonotrode is subjected to only a very low degree of flexion as a result of compression and welding pressures. The bending has almost no practical effect on the fixed adjustment of the gaps between the sonotrode and the anvil.

The device is preferably constructed so that the first anvil part is mounted to move horizontally and parallel to the sonotrode face which is fixed. The first anvil face, carried by said first anvil part, is positioned vertically, i.e. at right angles with respect to the sonotrode face. The underside of the first anvil part, immediately adjacent to the sonotrode face, overlaps slightly the sonotrode face when the first anvil part is moved into its open position. The second anvil part is mounted to move vertically, and carries the third anvil face which extends below the compression space immediately adjacent to a side of the sonotrode head. The second anvil part also carries a cross head disposed at right angles to the axis of the anvil part and projecting into the compression space. The underside of the projection forms the second anvil face. The vertical surface of the crosshead, which faces the first anvil face, serves as an abutment or stop for said first horizontally moving anvil part in its closed position. The projection of the head thus determines the width of the compression space which is less than that of the fixed sonotrode face. This arrangement produces a compression space of roughly rectangular cross section and of constant width and varying height. The compression space, which is accessible through the gap between the first anvil part and the abutment when the first anvil part is in open position, will vary in size as a function of the dimensions of the electric conductors which have to be inserted, as well as of the degree of compression required.

It is advantageous if an arrangement is selected in which the width of the second anvil face (the underside of the projection of the head) can be adjusted. In this way, the width of the compression space can be varied to allow for variable joint or nodal widths.

One convenient embodiment of this invention provides for the second, vertically movable anvil part carrying the second and third anvil faces to be mounted on a rod slidably disposed in a support assembly. The crosshead, carrying the second anvil face, can be removed and replaced. By replacing the crosshead, compression spaces of varying widths can be accommodated, as a function of the distance the crosshead projects into the compression space. The aforesaid abutment face stops the first horizontally-movable anvil part at the point desired.

According to this invention, both the anvil parts, each of which is provided with a drive apparatus for the sliding movements, are connected to one another on a mounting block. These drive power units preferably consist of double-acting pneumatic cylinder and piston assemblies.

The apparatus according to this invention is not only designed for connecting two or more electric conductors to form a so-called conductor junction, but is also suitable for the compression and compact shaping of the ends of conductors by welding the individual strand wires together. In this case, the external configuration of the strand end will match the shape of the compression space. The compacting of a strand with the help of the device which is the subject of this invention obviously does not need to be limited to treating the ends of strands; practically any section of a strand can be compacted with this technique, provided that the insulation has first been removed from the area concerned.

Further details of this invention will now be elucidated in greater detail with the help of the following drawings which provide a schematic illustration of one embodiment of this invention.

Figure 3:
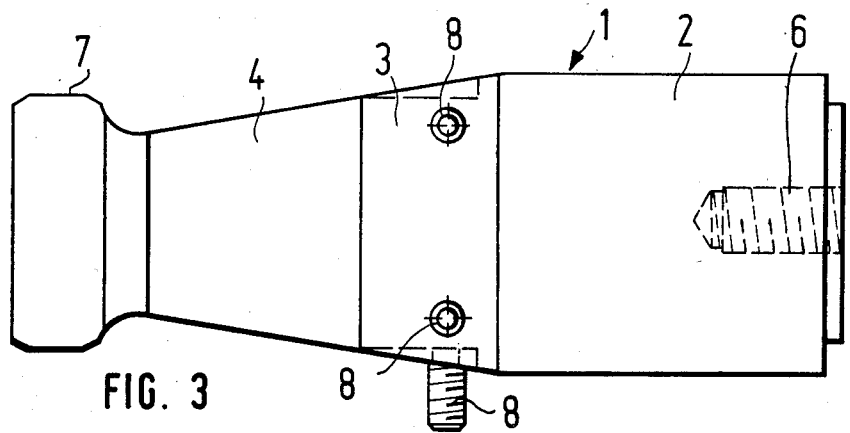
FIG. 3 shows a side view of the sonotrode.
Figure 4:
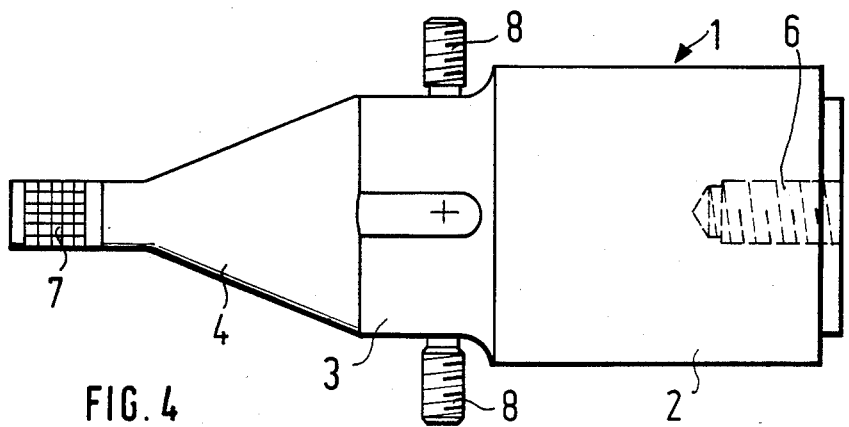
FIG. 4 shows a plan view of the sonotrode.
Figure 5:
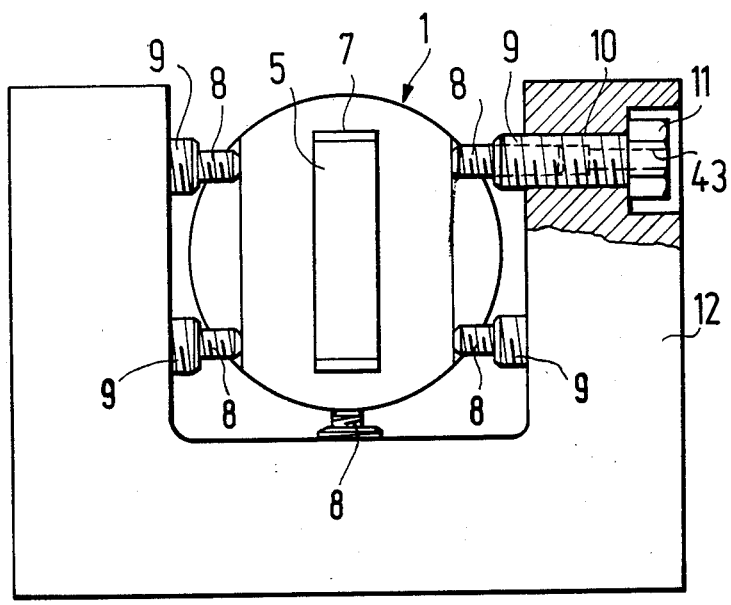
FIG. 5 shows an end view of a sonotrode fastened in its holder.
Figure 6:
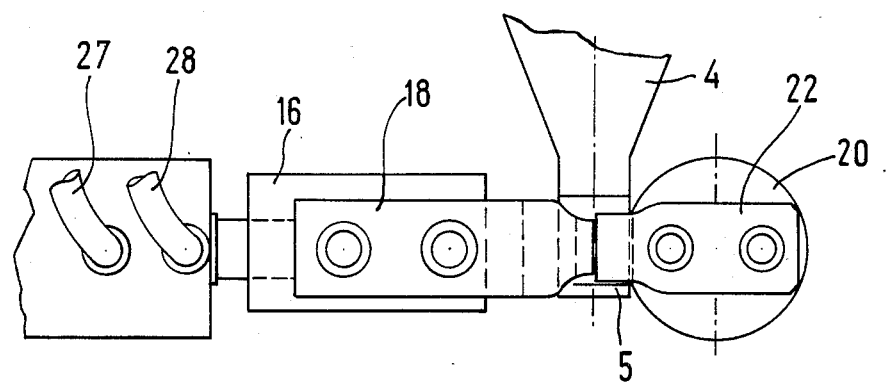
FIG. 6 is a plan view of the device of FIG. 1.

The sonotrode shown in FIGS. 3–5, and generally designated by the numeral 1, consists of a rear base part 2, a supporting section 3, an adjacent tapered area 4 and a sonotrode head 5 connected to the tapered area with a smooth transition. An attachment bore 6 is provided in the base part 2 with the help of which the sonotrode 1 is fastened to the converter, which is not shown here. The purpose of the converter is to transform electric vibration into ultrasonic vibration of a certain amplitude and frequency. The amplitude pattern is influenced by the configuration of the sonotrode. The production of ultrasonic vibrations and their utilization for the connection of workpieces are, however, well-known methods and no further explanations are required on the subject.

The sonotrode head 5, which has hitherto been referred to in place of the complete sonotrode 1, is essentially configured as an elongated rectangle, whereby the upper sonotrode face 7 will be activated for the welding process as explained below. To enhance its roughness, the sonotrode face 7 is given a texture, in the form of crossed striations, for example, which helps to improve the connection of the conductor ends.

Ultrasonic vibration takes place along the longitudinal axis of the sonotrode. To support the sonotrode 1 at fixed points at the final sound node upstream of the sonotrode itself, a number of threaded pins or similar devices 8 are inserted in the supporting section of the sonotrode at right angles to the sonotrode axis; all of these pins are in the same plane perpendicular to the axis of the sonotrode and their arrangement will be described below in greater detail. In the example illustrated here, two threaded pins 8 are arranged on each side of the sonotrode, whereas the sonotrode is supported from below with a single threaded pin (FIG. 5). Threaded bushings 9 are screwed on the threaded pins 8 and are screwed in turn into the stepped threaded bores 10 of a sonotrode holder 12. By tightening the threaded bushing 9 until the screwheads 11 bear against the steps of the stepped bores 10, the sonotrode 1 is firmly secured in its holder 12. The position of sonotrode 1 is finely adjusted with the threaded pins 8, which can be reached for adjustment purposes through a central bore 43 tapped in each of the threaded bushings. By varying the setting of the threaded pins 8, the sonotrode head 5 can be maintained in a set position with respect to the anvil parts which will be described below. In this way, the sonotrode 1 will be practically rigidly secured to its holder 12. Because of the limited leverage between the threaded pins 8 and the sonotrode head 5, reaction forces at right angles to the longitudinal axis of the sonotrode 1, can be accepted at the sonotrode head without any significant flexion.

Figure 1:
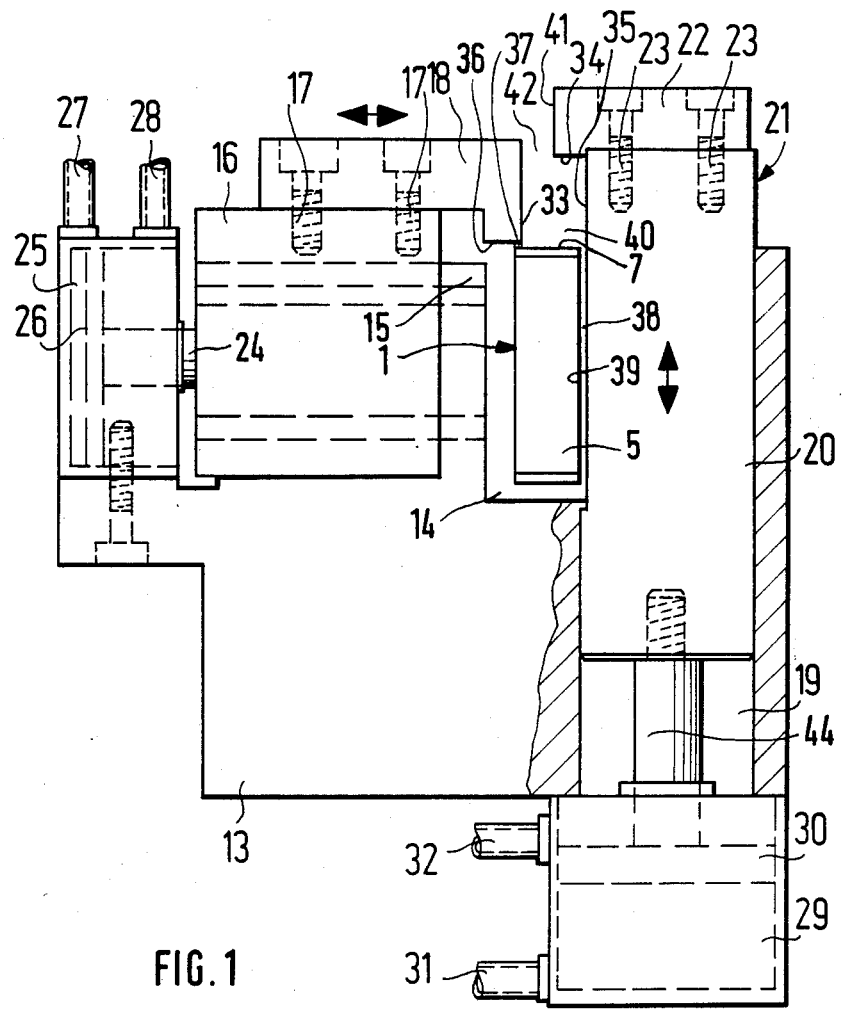
FIG. 1 shows the end view of the device with both anvil parts in the open position.
Figure 2:
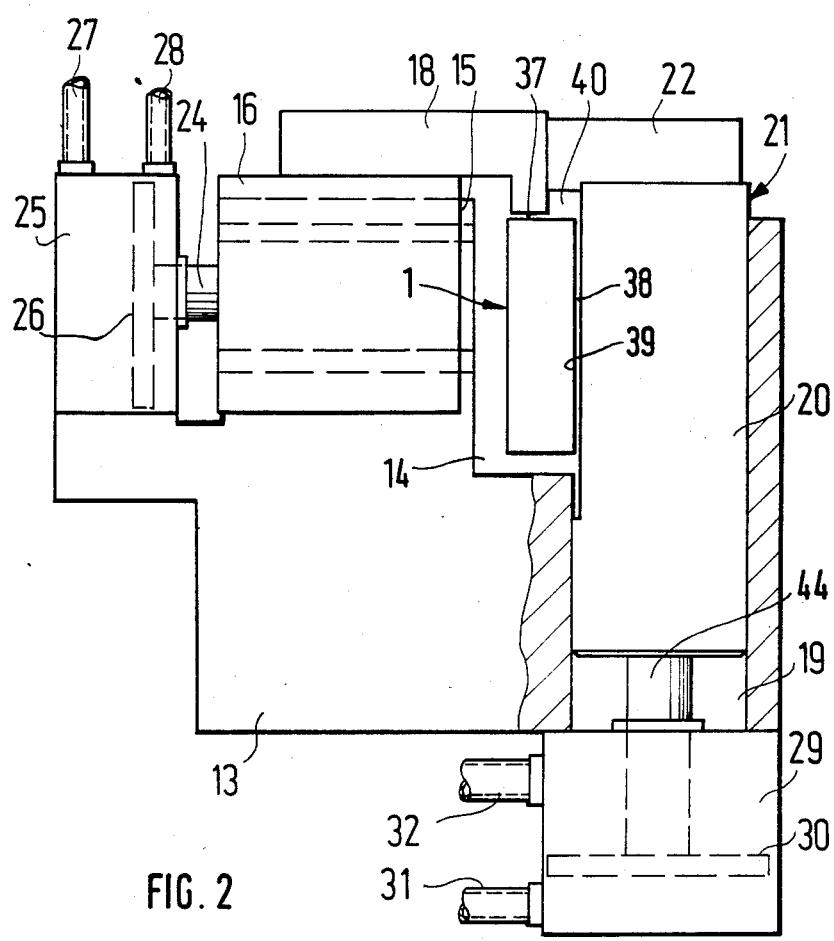
FIG. 2 shows the end view of the device with both anvil parts in the closed position.

Reference will now be made to FIGS. 1 and 2 to explain the part played by the anvil parts and the interaction between them and the sonotrode head itself. The mounting block 13 is rigidly connected to the sonotrode holder (not shown in this view). The sonotrode head 5 is located in a recess 14 in the mounting block 13, the opening of the recess being located upward. A transverse carriage 16 is located in a guideway 15 of the mounting block 13, whereby the carriage can move horizontally as indicated by the arrows. (FIG. 1.) The first anvil part 18, which moves horizontally, is firmly fixed to the transverse carriage 16 by means of screws 17. On the other side of the recess 14, a vertical guide bore 19 is located in the mounting block 13, in which a rod 20 is fitted, which can be moved up and down, as indicated by the arrows, but cannot revolve. This rod 20, which is an integral part of the second anvil part 21 and which can move vertically, extends upwards out of the guide bore 19. A crosshead 22 is mounted on its upper end, so as to constitute a further integral part of the anvil part 21. The crosshead 22 is firmly fixed to the rod 20 by means of screws 23 and projects beyond the rod 20 into the compression space.

The drive mechanism of the transverse carriage 16 consists of double-acting pneumatic drives. For this purpose, the piston rod 24 of piston 26 in a cylinder 25 is firmly fixed to the transverse carriage 16 and this constitutes the drive for the anvil part 18. The piston 26 is moved back and forth in the cylinder 25 by air pressure which is applied or evacuated, as the case may be, over air lines 27 and 28. The cylinder 25 is firmly fixed to the mounting block 13. A corresponding drive arrangement is provided for rod 20. In this case, the piston rod 44 of a piston 30 located in cylinder 29 is firmly maintained against the lower end of rod 20. The piston 30 and with it second anvil part 21, are moved up or down in the cylinder by air pressure which is applied or evacuated, as the case may be, through air lines 31 and 32.

The first anvil face 33 on the end of first anvil part 18 which moves horizontally is disposed at right angles to the sonotrode face 7. The second anvil face 34 is parallel to the sonotrode face 7 and is formed by the underside of crosshead projection. The third anvil face 35, which is parallel and opposed to the first anvil face 33, is fixed to vertically-movable rod 20.

A narrow, fine adjusted air gap is located between the under face 36 of first anvil part 18 and the opposed face 7 of the sonotrode. Face 36 is disposed at right angles to the first anvil face 33. This air gap remains constant throughout movement of the anvil part 18 as well as during the compression and welding phases. A corresponding air gap 38 is located between the third anvil face 35 and the neighboring parallel face 39 of sonotrode 1. The fine setting of air gaps 37 and 38 is about 0.01–0.02 mm, so as to insure clearance between anvil parts 18 and 21 on the one hand, and also to insure on the other hand that not even fine electric conductors can escape into air gaps 37, 38 from the compression space 40 which is bounded by the anvil faces 33–35 and by the sonotrode face 7. The fine adjustment of the air gap is performed by adjustment of the sonotrode 1 by means of the threaded pins 8 and the corresponding threaded bushings 9. This adjustment has only to be performed once as the air gap dimension will remain constant for all practical purposes thereafter.

In the open position shown in FIG. 1, the anvil part 18 is shown after it has traveled as far to the left as possible, and anvil part 21 is shown at the extreme upper limit of its travel. This results in a comparatively wide gap 42 for insertion of one or a plurality of conductor strands to be compacted and welded together by the effects of ultrasonic vibration. This gap is located between the first anvil face 33 and the abutment face 41 of the crosshead 22, vertically adjacent to the second anvil face 34.

In the illustration shown in FIG. 2, with the device in its closed position, the first anvil part 18 is moved as far to the right as possible (against abutment face 41) so that the gap through which conductors are inserted, is closed. On the other hand, in this condition, anvil 21 has moved to the lowest possible position required for compression of the electric conductors of one or a plurality of strands, which are not shown here.

Starting with the various parts of the device in the positions shown in FIG. 1, operation of the device can be described as follows: the strands, which are to be welded by ultrasonic means, are introduced into the compression area 40 through the gap 42. Next, with the help of the pneumatic drive device, first anvil part 18 is moved horizontally to the right until first anvil face 33 bears against the abutment face 41. During this process, faces 33 and 41 are not firmly pressed together but merely brought in contact with one another in order for the following relative movements between these two compoments to be performed with as little friction as possible. No gap is, however, created between faces 33 and 41. The compression space 40 has now been closed and at this stage its height is relatively large compared with its width.

The second anvil part 21 is now moved downwards under the effect of its drive mechanism, whereby the abutment face 41 slides over the first anvil face 33. As anvil part 21 continues to move downwards, the height of the compression space 40 progressively diminishes until the compression space 40 has been reduced to the required volume. The brief ultrasonic treatment takes place in this condition until the conductors are fused together. At the end of the welding process, anvil part 18 is retracted horizontally to its original position shown in FIG. 1. The anvil part 21 is next raised to its original position shown in FIG. 1. The welded strands can now be withdrawn, either back through the gap 42 through which they were inserted, or alternatively by pulling them through the open end of the compression space 40. The shape of the external cross section of the compressed and the welded electric conductors will now correspond to the cross section of the compression space in the welding position (FIG. 2). The width of the compressed and welded electric conductors, or of the node, for example, will be determined by the distance the crosshead 22 projects into space 40, which is in essence, the preset width of the second anvil face 34. This width can be changed by substituting a longer crosshead 22. The screws 23 in the crosshead 22 could also be fitted with slotted holes, thus allowing stepless adjustment of the width of the second anvil face 34.

The height of the compressed and welded product, or of the node, for example, will depend on the total volume of the electric conductors inserted in the device and also on the required degree of compression. The length of the compression and welding section, and thus of the node, will depend on the depth, that is to say of the dimension (not shown here) between the first and the third anvil faces 33, 35 perpendicular to the plane of projection and the corresponding working surface of the sonotrode face 7.

What is claimed is:

1. In a device for ultrasonically welding electrical conductors comprising
   a sonotrode which produces ultrasonic vibrations, said sonotrode having a head with a fixed face disposed parallel to the axis of the ultrasonic vibrations, and
   an adjustable compression space adjacent said fixed face and defined by anvil faces for retaining and compressing said conductors during the welding process
   the improvement comprising
   a first anvil part slidably mounted for back and forth movement parallel to said fixed face and having
      a first anvil face at the end thereof disposed at right angles to said fixed face
   a second anvil part slidably mounted adjacent said sonotrode head for up and down movement normal to said fixed face, said second anvil part having
      a projection at its upper end extending into said compression space, the underside of said projection forming a second anvil face parallel to said fixed face and
   a third anvil face normal to said fixed face below said projection whereby said compression space is defined by said first, second and third anvil faces in conjunction with said fixed face and is adjustable by moving said first and second anvil parts with respect to said fixed face.

2. The device of claim 1 in which said sonotrode has a body mounted on adjustable pins which bear against opposed sides of said body to permit accurate control of the size of a gap between said fixed face and first anvil part and a gap between said head and said second anvil part.

3. The device of claim 2 in which said gaps are between 0.01 and 0.02 millimeters wide.

4. The device of claim 2 in which said pins are located in the last sound node before the end of said sonotrode head to minimize flexion of said head.

5. The device of claim 1 in which said projection comprises part of a separate crosshead secured to the top of said second anvil part.

6. The device of claim 1 in which said second anvil part consists of a rod on which said third anvil face is located.

7. The device of claim 1 in which said first and second anvil parts are each actuated by a double acting pneumatic cylinder.

* * * * *